United States Patent
Oh et al.

(10) Patent No.: US 7,555,028 B2
(45) Date of Patent: Jun. 30, 2009

(54) METHOD AND SYSTEM FOR DEFINING ADDITIONAL SPREAD SPECTRUM CHANNELS WITHIN A COVERAGE AREA OF AN EXISTING WIRELESS NETWORK

(75) Inventors: Dae-Sik Oh, Overland Park, KS (US); Mark Yarkosky, Overland Park, KS (US)

(73) Assignee: Sprint Spectrum L.P., Overland Oark, KS (US)

( * ) Notice: Subject to any disclaimer, the term of this patent is extended or adjusted under 35 U.S.C. 154(b) by 1346 days.

(21) Appl. No.: 10/138,203

(22) Filed: May 3, 2002

(65) Prior Publication Data

US 2007/0297490 A1 Dec. 27, 2007

(51) Int. Cl.
*H04B 1/707* (2006.01)
(52) U.S. Cl. .................................. 375/130; 375/141
(58) Field of Classification Search ................ 375/130, 375/141, 145, 140; 370/320, 335, 342, 441, 370/347; 455/436–449, 454, 422.1, 450, 455/427

See application file for complete search history.

(56) References Cited

U.S. PATENT DOCUMENTS

| | | | | |
|---|---|---|---|---|
| 5,936,950 A | * | 8/1999 | Hottinen | 370/342 |
| 6,101,176 A | * | 8/2000 | Honkasalo et al. | 370/335 |
| 6,104,746 A | * | 8/2000 | Ishikawa et al. | 375/140 |
| 6,130,886 A | * | 10/2000 | Ketseoglou et al. | 370/347 |
| 6,381,461 B1 | * | 4/2002 | Besson et al. | 455/450 |
| 6,771,963 B1 | * | 8/2004 | Cheng et al. | 455/437 |
| 6,781,974 B1 | * | 8/2004 | Tsumura | 370/335 |
| 6,792,276 B1 | * | 9/2004 | Butovitsch et al. | 455/453 |
| 2002/0173272 A1 | * | 11/2002 | Liang et al. | 455/63 |
| 2002/0176386 A1 | * | 11/2002 | Singh | 370/338 |
| 2003/0096574 A1 | * | 5/2003 | Anderson et al. | 455/13.2 |
| 2003/0162545 A1 | | 8/2003 | Csapo et al. | |
| 2005/0059401 A1 | * | 3/2005 | Chen et al. | 455/437 |
| 2006/0194576 A1 | * | 8/2006 | Karabinis et al. | 455/427 |

FOREIGN PATENT DOCUMENTS

WO 97/15985 A1 5/1997

OTHER PUBLICATIONS

International Search Report and Written Opinion from related International application No. PCT/US2007/077738, mailed Feb. 20, 2008.

* cited by examiner

*Primary Examiner*—Don N Vo (57) ABSTRACT

A method and system for defining additional spread spectrum channels within a coverage area already served by an existing wireless network. A first spread spectrum channel may be defined by a first range of frequencies. A second spread spectrum channel may be defined by a second range of frequencies. A portion of the first range of frequencies may overlap with a portion of the second range of frequencies. The overlap may be such that the first spread spectrum channel and the second spread spectrum channel may carry signals that minimally interfere with each other.

25 Claims, 6 Drawing Sheets

METHOD AND SYSTEM FOR DEFINING ADDITIONAL SPREAD SPECTRUM CHANNELS WITHIN A COVERAGE AREA OF AN EXISTING WIRELESS NETWORK

BACKGROUND

1. Field of Invention

This invention relates to telecommunication services and more particularly to a method and system for defining additional spread spectrum channels within a coverage area of an existing wireless network.

2. Description of Related Art

Telecommunication technology offers people a number of ways to communicate with each other. A mobile terminal is one of the more popular modes of communication.

The mobile terminal may be a cellular telephone or computer with wireless modem, for example, which an individual uses to readily communicate with others. The mobile terminal facilitates communication with a remote device, e.g., another cellular telephone, computer, or a landline phone, through a wireless network.

The wireless network typically has a base station that produces a radiation pattern.

The radiation pattern defines a coverage area of the wireless network. The coverage area can include both public and private areas. Public areas may include areas such as roadways. Private areas may include areas such as buildings.

The base station and the mobile terminal can exchange signals within the coverage area. The signals that the base station and the mobile terminal exchange are spread over a range of frequencies. The range of frequencies defines a spread spectrum channel that carries the signals.

The signals are spread over the range of frequencies in a deterministic way. For example, the signals may be transmitted as short bursts of data over specific frequencies within the spread spectrum channel. The specific frequencies are carefully coordinated between a transmitter and a receiver, e.g., mobile terminal and base station, or vice-versa.

As a result, the transmitter or receiver, knowing the specific frequencies, can recover the signals carried over the spread spectrum channel.

SUMMARY

Even though the coverage area of a wireless network can include both public and private areas, the coverage in the private areas is typically inadequate. Building walls and electronics in the private areas, for example, may interfere with the radiation pattern that defines the coverage area of the wireless network. Therefore, it would be advantageous to establish a separate wireless network within the private area to provide separate wireless network service.

In accordance with a principle aspect of the present invention, a first spread spectrum channel defined by a first range of frequencies may overlap in frequency with a portion of a second spread spectrum channel defined by a second range of frequencies.

The overlap of the first spread spectrum channel with the second spread spectrum channel allows for communication to take place over the first spread spectrum channel without interfering with communication on the second spread spectrum, and vice-versa.

As a result, a separate wireless network service may be provided within a coverage area that coincides with that of an existing wireless network.

According to an exemplary embodiment of the present invention, the first spread spectrum channel may be part of a wireless network that provides coverage in public and private areas. And the second spread spectrum channel may be part of a separate wireless network that provides coverage in private areas. The first range of frequencies may define the first spread spectrum channel and the second range of frequencies may define the second spread spectrum channel. Approximately ½ of the first range of frequencies may overlap with approximately ½ of the second range of frequencies. The overlap of approximately ½ the first range of frequencies with approximately ½ of the second range of frequencies may allow for the first spread spectrum channel and the second spread spectrum channel to carry signals with minimal interference between each other.

These as well as other aspects and advantages of the exemplary embodiments will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
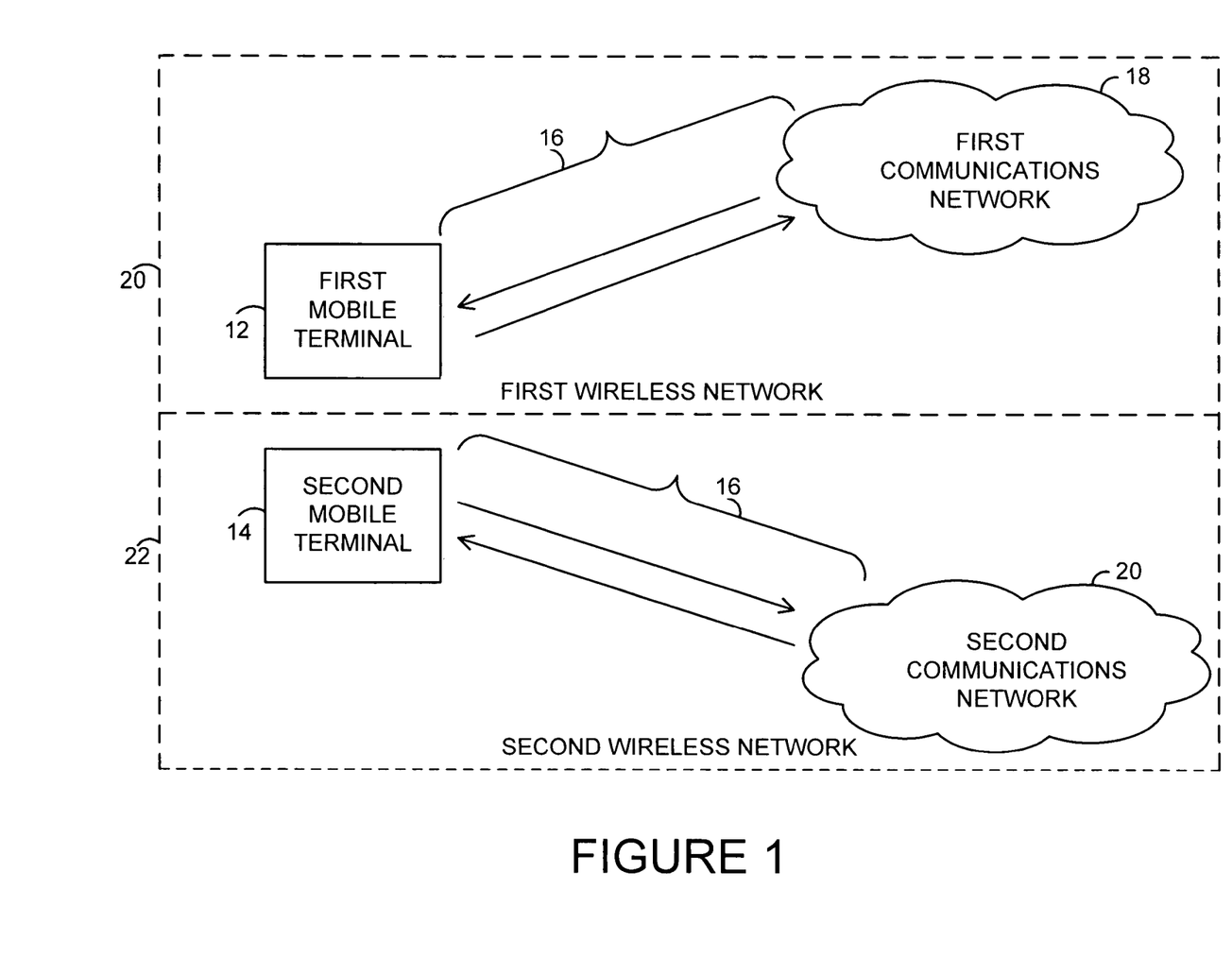
FIG. 1 illustrates a wireless network configuration consisting of a first wireless network, e.g., a public wireless network, and a second wireless network, e.g., a private wireless network, which share an air interface.

FIG. 1 illustrates a wireless network configuration in which exemplary embodiments of the present invention may be employed. Those skilled in the art will appreciate that many of the elements described in the exemplary embodiments are functional entities that may be implemented as discrete components or in conjunction with other components, in any suitable combination or location. Still further, the various functions described herein as being performed by one or more entities may be carried out by a processor programmed to execute an appropriate set of computer instructions stored in memory. Provided with the present disclosure, those skilled in the art can readily prepare the appropriate set of computer instructions (e.g., software) to perform such functions.

The wireless network configuration of FIG. 1 is shown to include a first wireless network 20 and a second wireless network 22. The first wireless network 20 and the second wireless network 22 may be operated by different service providers or the same service provider. Additionally, the first wireless network 20 and the second wireless network 22 may provide wireless network coverage over an air interface 16 shared between the first wireless network 20 and the second wireless network 22. For example, the first wireless network 20 may be a public wireless network that provides wireless network coverage within public areas such as roadways and private areas such as interiors of buildings. And the second wireless network 22 may be, for example, a private wireless network that provides wireless network coverage within the private areas such as the interiors of buildings. Other arrangements are also possible.

The first wireless network 20 may have first mobile terminals 12 and the second wireless network 22 may have second mobile terminals 14. The first mobile terminals 12 and the second mobile terminals 14 may be wireless devices such as cellular telephones or computers with wireless modems. Further, the first wireless network 20 may have a first communication network 18 and the second wireless network 22 may have a second communication network 20. The first communication network 18 may exchange first signals with the first mobile terminal 12 over the air interface 16. Similarly, the second communication network 20 may exchange second signals with the second mobile terminal 14 over the air interface 16.

A first spread spectrum channel may carry the first signals of the first wireless network 20 over the air interface 16. Similarly, a second spread spectrum channel may carry the second signals of the second wireless network 22 over the air interface 16. The first spread spectrum channel and the second spread spectrum channel may conform to code division multiple access (CDMA) protocol. CDMA is a spread spectrum technology that spreads information in an original signal over a bandwidth that is greater than that of the original signal. Of course, the first spread spectrum channel and the second spread spectrum channel may conform to other types of spread spectrum protocols.

The first communication network 18 and the second communication network 20 may each include a respective base station. The respective base station may define the wireless network coverage of the first wireless network 20 or the second wireless network 22. The respective base station may be additionally coupled to a public switched telephone network (PSTN) and/or to the Internet. The PSTN and/or the Internet may facilitate communication with a remote device such as a cellular telephone, a computer, or a landline phone. Of course, the first communication network 18 and the second communication network 20 may have additional or different network elements from what is described herein.

Figure 2:
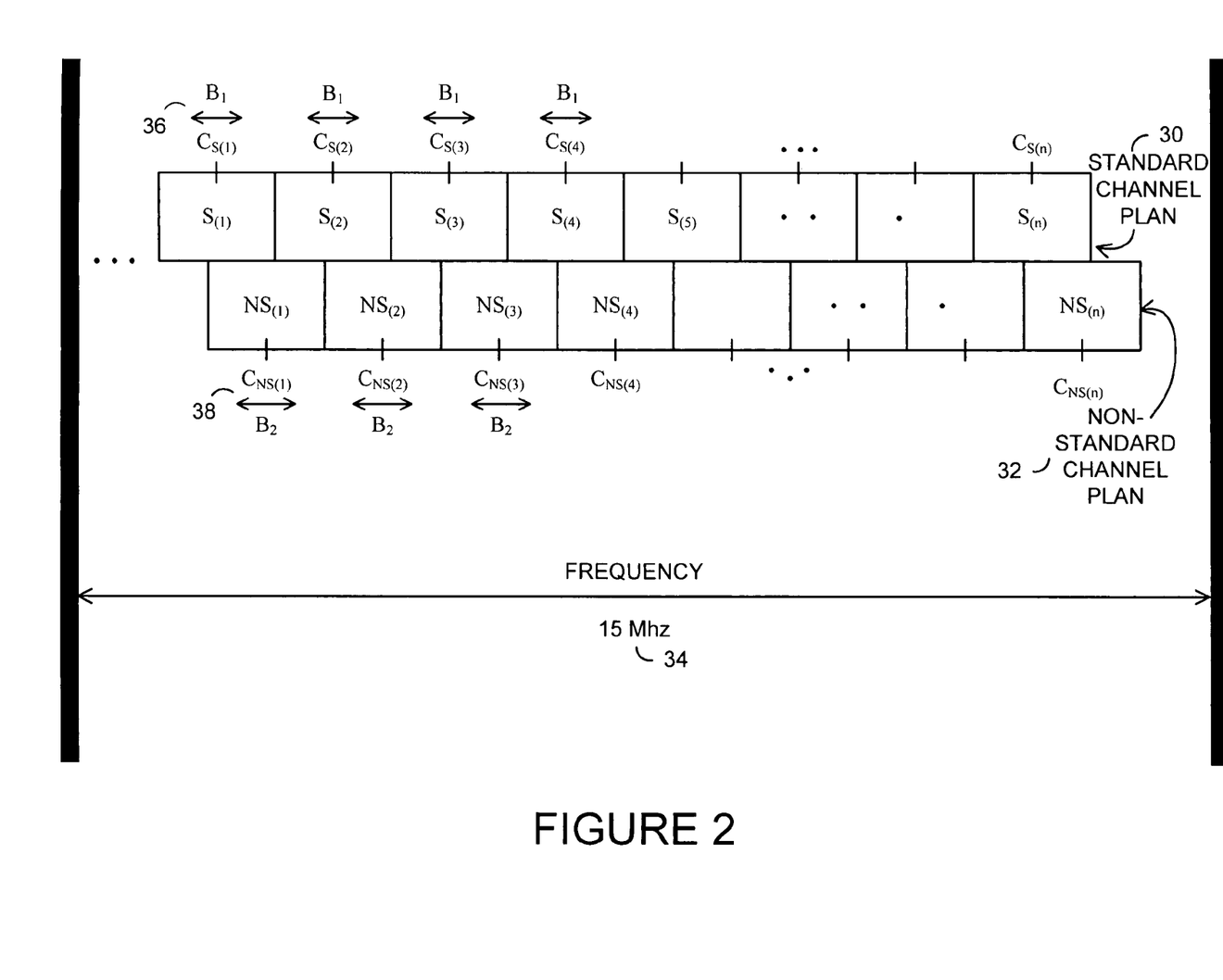
FIG. 2 illustrates a frequency spectrum of the air interface where spread spectrum channels overlap in frequency.

FIG. 2 illustrates a frequency spectrum of the air interface 16 in accordance with an exemplary embodiment of the present invention. A first set of spread spectrum channels 30 may have spread spectrum channels S(1) ... S(n) that carry the first signals over the air interface 16. Similarly, a second set of spread spectrum channels 32 may have spread spectrum channels NS(1) ... NS(n) that carry the second signals over the air interface 16.

The first set of spread spectrum channels 30 and the second set of spread spectrum channels 32 may be referred to as a standard channel plan 30 and a non-standard channel plan 32, respectively. The first wireless network 20, e.g., the public wireless network, may use the spread spectrum channels of the standard channel plan 30 to carry signals within a coverage area defined by the base station of the first communication network 18. And the second wireless network 22, e.g., the private wireless network, may use the spread spectrum channels of the non-standard channel plan to carry signals within a coverage area defined by the base station of the second communication network 20. Alternatively, the spread spectrum channels of the standard channel plan 30 and the non-standard channel plan 32 may be allocated to a single wireless network (e.g., the public wireless network or the private wireless network) so that the single wireless network can communicate an increased a number of signals over the air interface 16. Still alternatively, the spread spectrum channels of the standard channel plan 30 and the non-standard channel plan 32 may be allocated to more than two wireless networks. Other arrangements are also possible.

Each of the spread spectrum channels of the standard channel plan 30 and the non-standard channel plan 32 may be defined by a respective range of frequencies. Each of the spread spectrum channels of the standard channel plan may have a bandwidth $B_1$. Similarly, each of the spread spectrum channels of the non-standard channel plan may have a bandwidth $B_2$ 38. The bandwidth $B_1$ 36 may, but need not, be approximately equal to the bandwidth $B_2$ 38.

Each of the spread spectrum channels may also have a center frequency. The center frequency may identify a frequency within the range of frequencies. Preferably, the frequency is in the center of the range of frequencies for each of the spread spectrum channels. The center frequency of each of the spread spectrum channels in the standard channel plan 30 may be defined by discrete frequencies $C_s(1)$, $C_s(2)$, $C_s(3)$, ... $C_s(n)$. Furthermore, the center frequency of each of the spread spectrum channels in the non-standard channel plan 32 may be defined by discrete frequencies $C_{ns}(1)$, $C_{ns}(2)$, $C_{ns}(3)$, ... $C_{ns}(n)$.

According to the exemplary embodiment of the present invention, the range of frequencies of a spread spectrum channel in the standard channel plan 30 may overlap with a portion of the range of frequencies of a respective spread spectrum channel in the non-standard channel plan 32. The overlap may be greater than zero but less than approximately ½ of the range of frequencies that defines each spread spectrum channel in the standard channel plan 30. Alternatively, the overlap may be greater than zero but less than approximately ½ of the range of frequencies that defines each spread spectrum channel in the non-standard channel plan 32.

Referring to FIG. 2, the overlap may be precisely defined in terms of the center frequencies of the spread spectrum channels. In a preferred embodiment, the center frequency $C_s(1)$ may be offset from the center frequency $C_{ns}(1)$ by approximately ½ the bandwidth $B_1$ or $B_2$, center frequency $C_s(2)$ may be offset from the center frequency $C_{ns}(2)$ by approximately ½ the bandwidth $B_1$ or $B_2$, and, generally, center frequency $C_s(n)$ may be offset from the center frequency $C_{ns}(n)$ by approximately ½ the bandwidth $B_1$ or $B_2$. The offset may be approximately ½ the bandwidth of the spread spectrum channels of the standard channel plan 30 or the spread spectrum channels of the non-standard channel plan 32, whichever is greater. Thus, in the case of FIG. 2, where $B_1$ is equal to $B_2$, the offset may be approximately ½ $B_1$ or approximately ½ $B_2$.

The offset of approximately ½ of the bandwidth $B_1$ or ½ of the bandwidth $B_2$ results in the spread spectrum channel of the standard channel plan 30 overlapping with a portion of the respective spread spectrum channel of the non-standard channel plan 32. For example, if each spread spectrum channel of the standard channel plan 30 has a bandwidth of 1.25 MHz and each spread spectrum channel the non-standard channel plan 32 also has a bandwidth of 1.25 MHz, then the center frequency $C_s(1)$ may be offset by 0.625 MHz from the center frequency $C_{ns}(1)$, the center frequency $C_s(2)$ may be offset by 0.625 MHz from the center frequency $C_{ns}(2)$ etc.

In the preferred embodiment, the overlap may allow for eleven spread spectrum channels in the standard channel plan 30 to share approximately a 15 MHz frequency spectrum (1.25 MHz×11 spread spectrum channels=13.75 MHz plus 1.25 MHz guard bands on either side of the standard channel plan) in the standard channel plan 30 with nine spread spectrum channels (1.25 MHz×9 spread spectrum channels=11.25 MHz plus 0.625 MHz guard bands on either side of the non-standard channel plan) in the non-standard channel plan 32. Moreover, the signals carried by the spread spectrum channels of the standard channel plan 30 and the non-standard channel plan 32 may minimally interfere with each other. Other arrangements are also possible.

The spread spectrum channels of the standard channel plan 30 and the non-standard channel plan 32 may carry a signal that is originally a narrow band signal. The narrow band signal may have a bandwidth much less than the range of frequencies that defines each spread spectrum channel of the standard channel plan 30 or the non-standard channel plan 32. As a result, the narrow band signal may have to be spread over the range of frequencies and modulated onto a carrier frequency so that a spread spectrum channel may carry the narrow band signal over the air interface 16.

Figure 3:
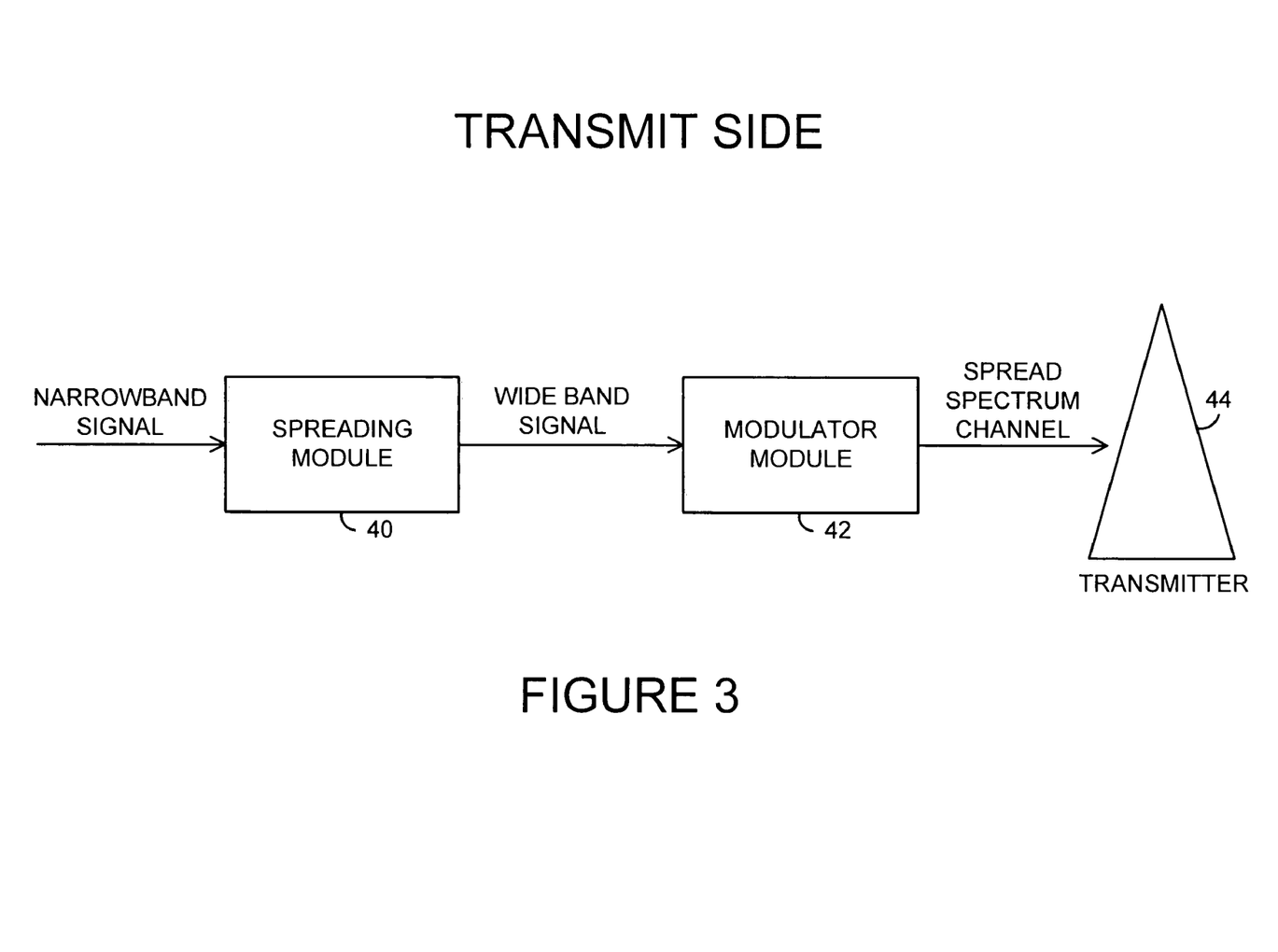
FIG. 3 illustrates a process for spreading and modulating the narrow band signal onto one of the spread spectrum channels defined by FIG. 2.

FIG. 3 illustrates a process for spreading and modulating the narrow band signal onto one of the spread spectrum channels defined by FIG. 2. The narrow band signal may be, for example, a speech signal, having a bandwidth of 3 kHz. The narrow band signal may be spread at a spreading module 40. The spreading module 40 may convert the narrow band signal into a wide band signal. The wide band signal may have a bandwidth greater than the narrow band signal. Additionally, the wide band signal may extend over the range of frequencies defined by the spread spectrum channel.

The wide band signal may be modulated at a modulation module 42. The modulation module 42 may modulate the wide band signal onto a carrier wave at a carrier frequency. The carrier frequency may be selected to preferably match the center frequency of the spread spectrum channel that carries the wide band signal. Then, the wide band signal may be transmitted at a transmitter 44 over the air interface 16.

The transmitter may transmit the wide band signal at a defined power level. The power level at which the wide band signal is transmitted may depend on a power level of wide band signals carried by an overlapping spread spectrum channel. A difference in the power level of the wide band signals carried by the overlapping spread spectrum channel and the power level of the wide band signal to be transmitted at the transmitter 44 may be 5 dBm or less. As a result, the presence of the overlapping spread spectrum channel may have a negligible impact on the wide band signal to be transmitted at the transmitter 44 and vice versa.

Figure 4:
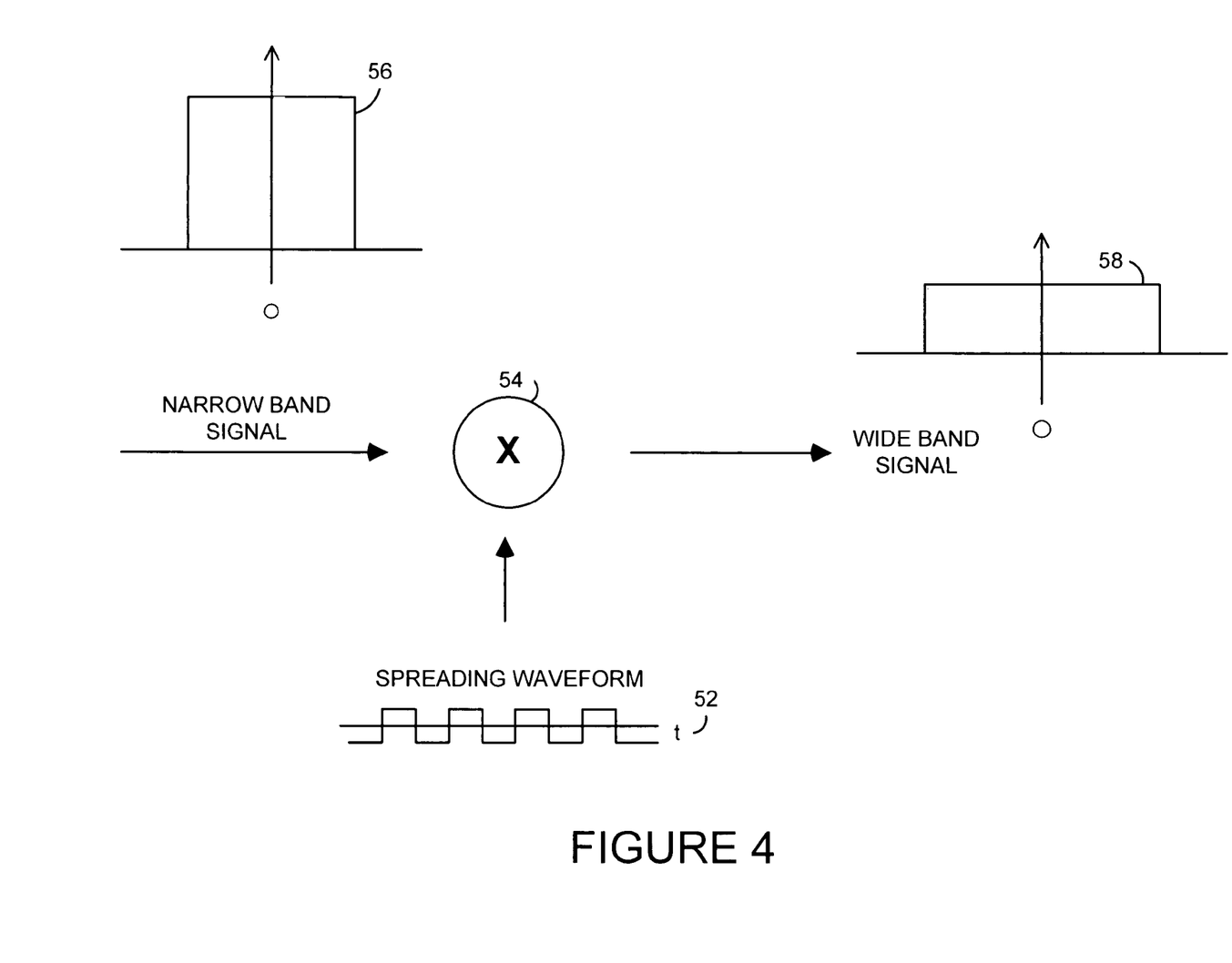
FIG. 4 illustrates a process for converting the narrow band signal into a wide band signal.

FIG. 4 illustrates in more detail the process of spreading that is shown in block 40 of FIG. 3. The process of spreading may involve multiplying the narrow band signal with a spreading waveform 52. The narrow band signal may have a frequency spectrum 56. The spreading waveform 52 may be a Walsh code or other type of random or pseudo-random sequence with a bandwidth much greater than that of the narrow band signal. When multiplied at an operator 54, for example, the spreading waveform 54, e.g., a 1.25 MHz code sequence, may convert the narrow band signal into the wide band signal. The wide band signal may have a frequency spectrum 58 that occupies a range of frequencies greater than the frequency spectrum 56 of the narrow band signal.

The spreading waveform 52 may spread the narrow band signal over the range of frequencies in a deterministic way so that a receiver, for example, that knows the spreading sequence can recover the narrow band signal from the wide band signal. The wide band signal may extend over a range of frequencies approximately the same as the bandwidth of the spreading sequence, e.g., 1.25 MHz, but other arrangements are also possible.

Figure 5:
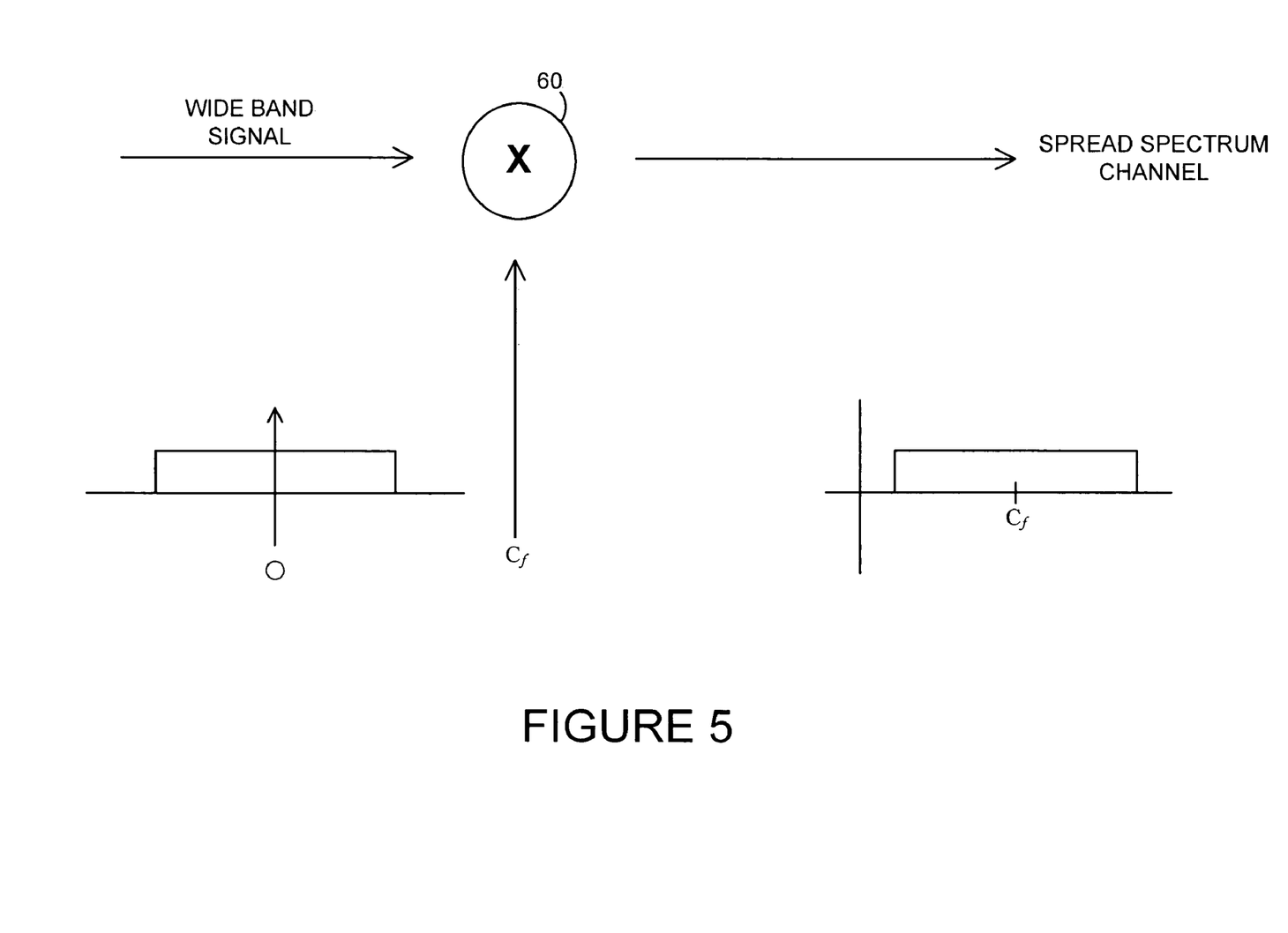
FIG. 5 illustrates a process for modulating the wide band signal onto the spread spectrum channel.

FIG. 5 illustrates in more detail the process of modulation that is shown in block 42 of FIG. 3. A carrier wave at a carrier frequency $C_f$ may be multiplied or convolved with the wide band signal. An operator 60, for example, may multiply or convolve the wide band signal with the carrier wave at the carrier frequency $C_f$ so as to modulate the wide band signal at the carrier frequency. The wide band signal, being modulated, may then be transmitted at the transmitter 44 over the air interface 16 at the defined power level.

The carrier frequency $C_f$ may be selected so that the wide band signal is preferably centered at the center frequency $C_s(n)$ or $C_{ns}(n)$ of the spread spectrum channel that is to carry the wide band signal. With such a carrier frequency, the wide band signal, when carried by the spread spectrum channel, may overlap with a portion of another spread spectrum channel in accordance with the exemplary embodiments of the present invention. Additionally, the wide band signal may not extend beyond the range of frequencies of the spread spectrum channel that is to carry the wide band signal.

Figure 6:
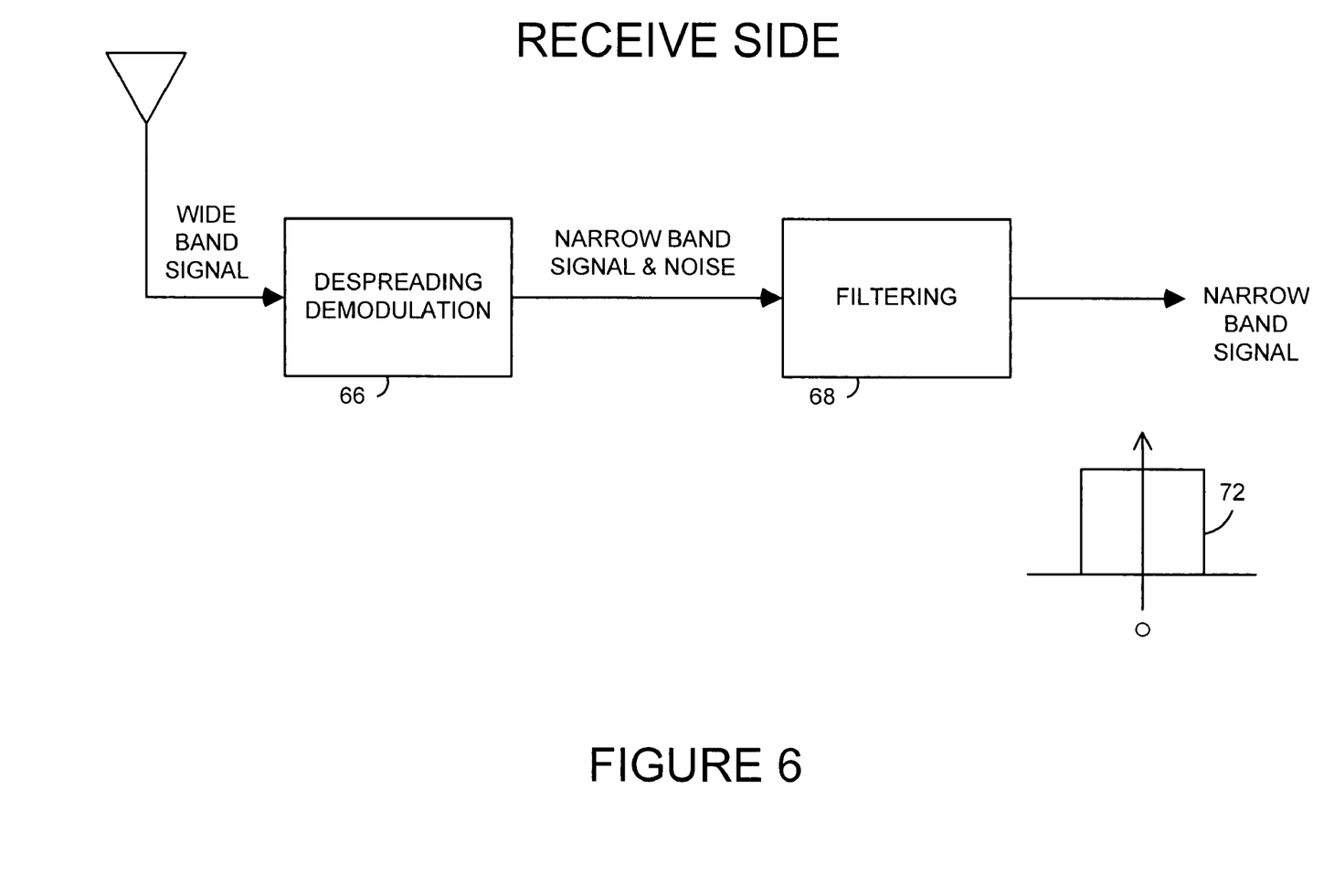
FIG. 6 illustrates a process for recovering the narrow band signal from the spread spectrum channel.

FIG. 6 illustrates a process for recovering the narrow band signal from the spread spectrum channel. The process for recovering the narrow band signal from the wide band signal carried by the spread spectrum channel may include the process of de-modulating and de-spreading the wide band signal carried by the spread spectrum channel at step 66 and filtering the narrow band signal at step 68. The wide band signal carried by the spread spectrum channel may be demodulated by passing the wide band signal through a notch filter, for example, that suppresses the carrier wave at the carrier frequency $C_f$. The wide band signal may be de-spread by multiplying the wide band signal with the spreading waveform 52 that spread the narrow band signal. The multiplying of the wide band signal by the spreading waveform 52 results in a recovery of the narrow band signal. Then, a filter at step 68 may be applied to the narrow band signal to band limit the narrow band signal and remove any noise in the narrow band signal. Of course, other arrangements are also possible for recovering the narrow band signal from the spread spectrum channel.

Exemplary embodiments of the present invention have thus been illustrated and described. It will be understood, however, that changes and modifications may be made to the invention as described without deviating from the spirit and scope of the invention, as defined by the following claims.

We claim:

1. A method of providing wireless network service, the method comprising:
   establishing a first spread spectrum channel defined by a first range of frequencies;
   establishing a second spread spectrum channel defined by a second range of frequencies, wherein the first range of frequencies overlaps with a portion of the second range of frequencies and the portion of the second range of frequencies that overlaps with the first range of frequencies is approximately half of the second range of frequencies;
   communicating a first signal over the first range of frequencies with a first wireless terminal; and
   communicating a second signal over the second range of frequencies with a second wireless terminal, wherein the first signal has a first power level, the second signal has a second power level, and a difference between the first power level and the second power level is between zero and approximately 5 dBm.

2. The method of claim 1, wherein the first range of frequencies has a first center frequency, the second range of frequencies has a second center frequency, and the first center frequency is offset from the second center frequency by approximately half of the second range of frequencies.

3. The method of claim 1, wherein the first range of frequencies is approximately 1.25 MHz, the second range of frequencies is approximately 1.25 MHz, and the portion of the second range of frequencies that overlaps with the first range of frequencies is approximately 0.625 MHz.

4. The method of claim 1, wherein the first spread spectrum channel and the second spread spectrum channel are CDMA channels.

5. A system, comprising:
a first base station using a first spread spectrum channel defined by a first range of frequencies to communicate a first signal; and
a second base station, serving an area served by the first base station, using a second spread spectrum channel defined by a second range of frequencies to communicate a second signal, wherein the first range of frequencies overlaps with a portion of the second range of frequencies, and wherein the first signal has a first power level at the second base station, the second base station transmits the second signal at a second power level, and a difference between the first power level and the second power level is between zero and approximately 5 dBm.

6. The system of claim 5, wherein the portion of the second range of frequencies that overlaps with the first range of frequencies is a greater of (i) approximately ½ the first range of frequencies or (ii) approximately ½ the second range of frequencies.

7. The system of claim 5, wherein the portion of the second range of frequencies that overlaps with the first range of frequencies is defined by an offset between a first center frequency of the first spread spectrum channel and a second center frequency of the second spread spectrum channel, the offset being a greater of (i) approximately ½ the first range of frequencies or (ii) approximately ½ the second range of frequencies.

8. The system of claim 5, wherein the first range of frequencies is approximately 1.25 MHz, the second range of frequencies is approximately 1.25 MHz, and the portion of the second range of frequencies that overlaps with the first range of frequencies is approximately 0.625 MHz.

9. The system of claim 5, wherein the first spread spectrum channel and the second spread spectrum channel are CDMA channels.

10. In an area served by a first base station, the first base station using a first spread spectrum channel to communicate a first signal, the first spread spectrum channel being defined by a first range of frequencies, a system comprising:
a second base station, the second base station using a second spread spectrum channel to communicate a second signal, the second spread spectrum channel being defined by a second range of frequencies, wherein the second range of frequencies overlaps with a portion of the first range of frequencies, and wherein the first signal has a first power level at the second base station, the second base station transmits the second signal at a second power level, and a difference between the first power level and second power level is between zero and approximately 5 dBm.

11. The system of claim 10, wherein the portion of the second range of frequencies that overlaps with the first range of frequencies is a greater of (i) approximately ½ the first range of frequencies or (ii) approximately ½ the second range of frequencies.

12. The system of claim 10, wherein the portion of the second range of frequencies that overlaps with the first range of frequencies is defined by an offset between a first center frequency of the first spread spectrum channel and a second center frequency of the second spread spectrum channel, the offset being a greater of (i) approximately ½ the first range of frequencies or (ii) approximately ½ the second range of frequencies.

13. The system of claim 10, wherein the first range of frequencies is approximately 1.25 MHz, the second range of frequencies is approximately 1.25 MHz, and the portion of the second range of frequencies that overlaps with the first range of frequencies is approximately 0.625 MHz.

14. The system of claim 10, wherein the first spread spectrum channel and the second spread spectrum channel are CDMA channels.

15. A method of providing wireless network service, the method comprising:
establishing a first spread spectrum channel defined by a first range of frequencies;
establishing a second spread spectrum channel defined by a second range of frequencies, wherein the first range of frequencies overlaps with a portion of the second range of frequencies;
transmitting from a first base station a first signal over the first range of frequencies; and
transmitting from a second base station a second signal over the second range of frequencies, wherein the first signal has a first power level at the second base station, the second signal is transmitted at a second power level, and a difference between the first power level and the second power level is between zero and approximately 5 dBm.

16. The method of claim 15, wherein the portion of the second range of frequencies that overlaps with the first range of frequencies is a greater of (i) approximately ½ the first range of frequencies or (ii) approximately ½ the second range of frequencies.

17. The method of claim 15, wherein the portion of the second range of frequencies that overlaps with the first range of frequencies is defined by an offset between a first center frequency of the first spread spectrum channel and a second center frequency of the second spread spectrum channel, the offset being a greater of (i) approximately ½ the first range of frequencies or (ii) approximately ½ the second range of frequencies.

18. The method of claim 15, wherein the first range of frequencies is approximately 1.25 MHz, the second range of frequencies is approximately 1.25 MHz, and the portion of the second range of frequencies that overlaps with the first range of frequencies is approximately 0.625 MHz.

19. The method of claim 15, wherein the first spread spectrum channel and the second spread spectrum channel are CDMA channels.

20. The method of claim 15, wherein the first base station is in a public wireless network and the second base station is in a private wireless network.

21. A method of providing wireless network service, the method comprising:
establishing a first spread spectrum channel defined by a first range of frequencies;
establishing a second spread spectrum channel defined by a second range of frequencies, wherein the first range of frequencies overlaps with a portion of the second range of frequencies and the portion of the second range of frequencies that overlaps with the first range of frequencies is approximately half of the second range of frequencies;
transmitting from a first base station a first signal over the first range of frequencies; and transmitting from a second base station a second signal over the second range of frequencies, wherein the first signal has a first power level at the second base station, the second signal is transmitted at a second power level, and a difference between the first power level and the second power level is between zero and approximately 5 dBm.

22. The method of claim 21, wherein the first range of frequencies has a first center frequency, the second range of frequencies has a second center frequency, and the first center frequency is offset from the second center frequency by approximately half of the second range of frequencies.

23. The method of claim 21, wherein the first range of frequencies is approximately 1.25 MHz, the second range of frequencies is approximately 1.25 MHz, and the portion of the second range of frequencies that overlaps with the first range of frequencies is approximately 0.625 MHz.

24. The method of claim 21, wherein the first spread spectrum channel and the second spread spectrum channel are CDMA channels.

25. The method of claim 21, wherein the first base station is in a public wireless network and the second base station is in a private wireless network.

* * * * *